INVENTOR.
JAMES J. CALLAHAN
BY ROBERT D. ROBERTS

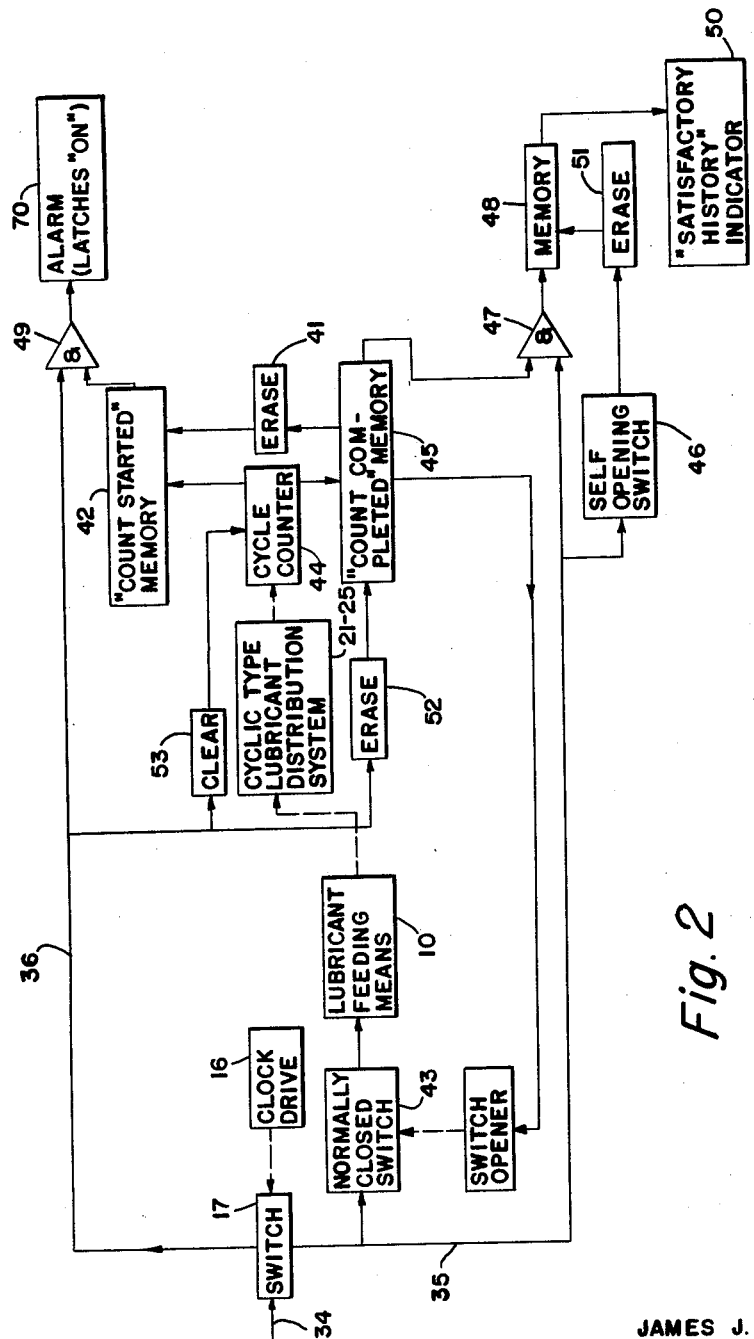

ATTORNEYS

United States Patent Office 3,127,954
Patented Apr. 7, 1964

3,127,954
LUBRICATION MONITORING SYSTEM
James J. Callahan, Mentor, and Robert D. Roberts, Solon, Ohio, assignors to Trabon Engineering Corporation, Solon, Ohio, a corporation of Ohio
Filed Aug. 24, 1962, Ser. No. 219,199
5 Claims. (Cl. 184—7)

This invention relates to flow responsive automatically controlled lubricating systems, particularly those which include a cyclic type distributor or distributors. As used herein the term "cyclic distributors" includes distributors of the type shown for example in U.S. Patents Re. 21,236; 2,718,281; 2,792,911; 2,834,433; 3,025,929 and copending application of Robson, Serial No. 822,611, filed June 24, 1959, now Patent 3,074,509 in which lubricant is received in a single main inlet of the distributor and is discharged in endless predetermined sequence through a number of outlets to a number of branch lines, the distributor having a plurality of plungers each of which travels back and forth once in the course of each cycle of operation of the distributor.

It has previously been proposed in connection with lubricant systems employing cyclic type distributors that the movement of at least one of the distributor plungers be employed to indicate the operation of the device. See for example U.S. Patent 2,834,433, col. 3, lines 42—55. These prior proposals have included a suggestion that such indication might be provided in connection with a timed cyclic system. However in such prior suggestions, the indication was merely a pulsing indication to indicate that the system was running. The on and off blinking of a light for example operated by the movement of one or more of the distributor plungers would indicate the operation of the system. This would either be a continuous indication of a continuously running system or a blinking indication during the active phase of a timed system which has both active and quiescent phases.

The present invention involves the concept of providing in a lubricant system having cyclic type lubricant distributors a means for turning on a lubricant feeding means upon initiation of the active phase of a control system which establishes active and quiescent phases, a means for thereafter turning off the lubricant feeding means upon completion of the desired amount of cycling of a lubricant distributor, and indicator means responsive only to a sequence in which the desired amount of cycling is completed during the active phase established by the control system.

The result is to provide over an extended period of months or years a reliable flow responsive positive monitoring of the distribution of lubricant within the system so as to indicate at any moment whether the history of the operation of the system is satisfactory as of that moment.

An example of the invention is illustrated in the accompanying drawings in which:

FIGURE 2 is a schematic representation of a monitoring and control system contemplated by the invention and used in association with the system shown in FIGURE 1.

Figure 1:
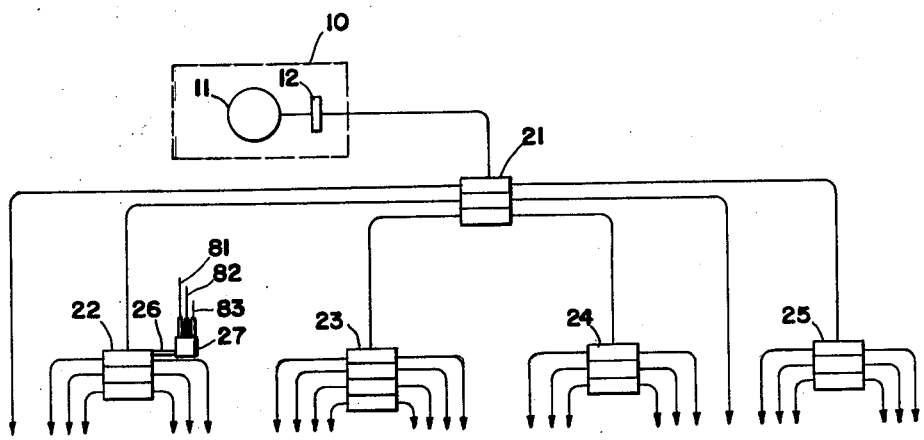
FIGURE 1 is a diagrammatic view of a lubrication system with which the invention may be used.

The lubricating system illustrated in FIGURE 1 supplies lubricant to several stations, indicated by the arrows at the downstream ends of the branch lines and proportions the supply of the lubricant between the several stations from a lubricant feeding means 10 which may itself include a pump 11 actuated by a pressure-responsive switch or the like supplied from a reservoir (not shown). Turning on and off the lubricant supply may consist merely in turning on the pump 11. Alternatively, the pump or other fluid supply or pressure-maintaining means may constantly run to afford a pressure supply head, and a solenoid operated valve 12 in the lubricant supply line may be opened and closed to turn on and off the lubricant feed to the system.

In some systems there may be no constant pressure source such as the pump 11, but instead there may be a single cycle pressure source such as for example a single cycle air-driven pump which shuts down after each cycle of operation. If the unit 11 is regarded as such an air-driven pump rather than an electrically powered pump, then the means for turning on and off the cycle comprises an air solenoid controlled by a pulsing switch which, when provided with electrical power, turns on and off at an appropriate frequency thereby turning on and off the air supply lines to the air motor of the pump 11 in such a manner as to cause it to constantly re-cycle so that in effect it is operating as a constantly running motor to constantly supply lubricant to the distribution system until such time as the power to the pulsing switch is discontinued, thereby shutting off the air solenoid.

Thus it will be understood that the lubricant feeding means may comprise an electric pump, a solenoid controlled lubricant valve between the lubrication network and a pressure source, an air driven pump which is re-cycled by the successively occurring on and off conditions of an air solenoid between the pump and a pressure source, or other equivalent lubricant feeding means.

Associated with the lubrication system are a number of distributors 21, 22, 23, 24, and 25. The distributor 21 will be seen to comprise a main distributor and the distributors 22–25 will be seen to comprise subsidiary distributors. These are cyclic type distributors as described for example in any of the foregoing patents.

One of the blocks of the subsidiary distributor 22 is provided with a protruding plunger extension 26 in the same manner as illustrated for example in U.S. Patent 2,834,433 at 2d, except that the extension 26 is adapted to actuate a switch 27 associated with a cycle counter as discussed below.

Figure 6:
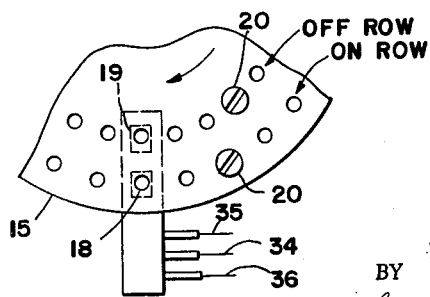
FIGURE 6 is a schematic view of a simple two-phase pin type timer employed in the illustrated example of the invention.

A portion of a simple clock driven timer which may be employed with the invention is illustrated in FIGURE 6. The timer comprises a disc 15 which is constantly rotated by a clock drive 16. A switch 17 is arranged so that when the button or tab 18 (FIGURE 6) is engaged, a connection between the leads 34 and 35 is established, and when the button or tab 19 is engaged, a connection between the leads 34 and 36 is established. The timing cycle is set by placing pins 20 in the proper holes to turn the switch 17 on and off at the desired times. Pin type timers of this kind are well known and may include only one set of pins as indicated in the drawings or may include, at the option of the user, several sets of pins placed around the periphery of the timer. In a typical timer application, a minimum of 37½ seconds "on" time may be provided; in a one-hour cycle either 7½ or 12 minutes "on" time may be provided; and 15 minutes may be provided for a 24-hour cycle. Thus in a 24-hour operation for example there may be one or two or more fifteen minute active cycles provided for by employment of such a timer and positioning of one, two, or three pairs of the pins 20 in the grouped together position. Obviously, longer active periods may be provided by spacing the associated pairs of on and off pins 20 further apart around the circumference of the wheel 15.

Other means may be employed for activating the lubricant feeding means for relatively short periods which are spaced relatively far apart in time, including clock driven switches of a form other than the pin-type switch 17, or switches driven back and forth between their two states by the intermittent activation and deactivation of the apparatus to be lubricated, such periods of activation also being spaced relatively far apart in time. The clock driven pin-type timer is illustrated for simplicity.

The operation of the monitoring and control system is schematically represented in FIGURE 2. The clock drive 16 positions the switch 17 so as to establish relatively short active phases in which the lead 34 is connected to the lead 35. Successive active phases are spaced relatively far apart from each other in time by intervening connections of the lead 34 to the lead 36 to establish intervening quiescent phases.

The pump motor, or solenoid operated valve, or solenoid controlled pulsing switch, or other equivalent device, comprises the lubricant feeding means 10 indicated in FIGURES 1 and 2. As indicated in the diagram, at the beginning of each active phase the lubricant feeding means 10 is activated through a normally closed switch 43. Activation of the lubricant feeding means causes the cyclic type lubricant distribution system 21–25 to commence cycling to thereby activate the switch 27 (FIGURE 1) associated with a cycle counter 44 (FIGURE 2). The counter 44 counts back and forth movements of the element 26 by counting the operation of the switch 27. When counting commences, the counter activates the "count started" memory element 42. Upon attainment of the desired count, the counter 44 activates the "count completed" memory device 45 which remains activated until subsequently erased. Memory device 45 in turn activates erase device 41 which erases the memory device 42.

If and only if the "count completed" memory device 45 is activated during the active phase established by the switch 17, a memory device 48 is activated through the "and" switch 47. The memory device 48 remains activated until subsequently erased. Activation of the memory device 48 in turn activates a "satisfactory history" indicator 50. The indicator 50 remains activated throughout the succeeding quiescent phase. At the beginning of each quiescent phase, the "count completed" memory element 45 is erased by the erase element 52, and the cycle count element 44 is cleared by the element 53 to prepare the system for a succeeding cycle of operation. At the beginning of the next succeeding active phase, the self-opening switch 46 is activated which in turn momentarily activates the erase device 51 to erase the memory device 48. The cycle as above described is then repeated.

Unless the "count completed" memory 45 is activated during the active phase, the switch 47 will not be closed and the "satisfactory history" indicator 50 will not be activated to show a "satisfactory history" indication during the next-succeeding quiescent phase.

Figure 3:
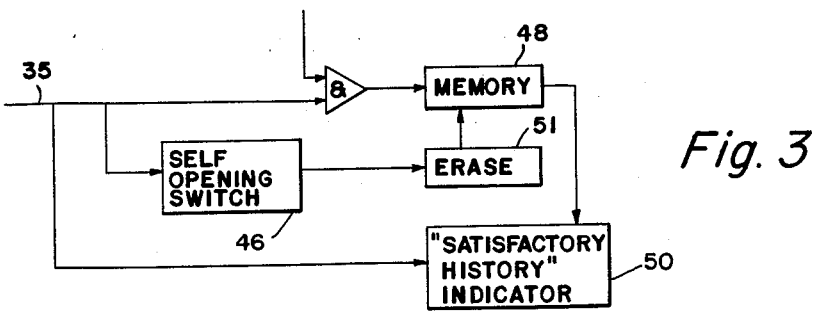
FIGURE 3 illustrates a certain elaboration of the system shown in FIGURE 2.

The system as described above does not give a "satisfactory history" indication during actual operation of the lubricant feeding means. However, a continuous indication may be given if desired. As shown in FIGURE 3, the lead 35 may constitute a direct input to the indicator 50. With this arrangement, the indicator 50 will remain activated during operation of the lubricant feeding means and will thereafter continue to be activated if and only if the desired count of lubrication cycles is completed during the active phase.

An alarm means 70 which stays activated when once energized until it is deliberately reset may be provided responsive only to the continued activation of the "count started" memory at the beginning of a quiescent phase. Unless the "count started" memory is deactivated prior to the quiescent phase, there will be a signal from an "and" switch 49 to activate the alarm means.

Figure 4:
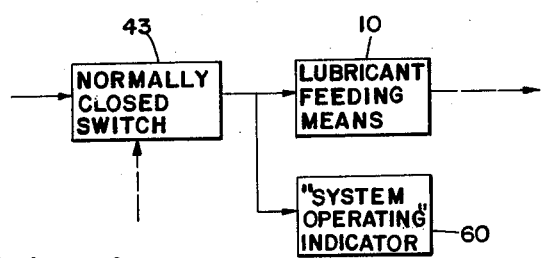
FIGURE 4 illustrates another elaboration of the system shown in FIGURE 2.

A "system operating" indicator 60 may be provided if desired as shown in FIGURE 4 to indicate when the lubrication system is actually supplying lubricant.

Figure 5:
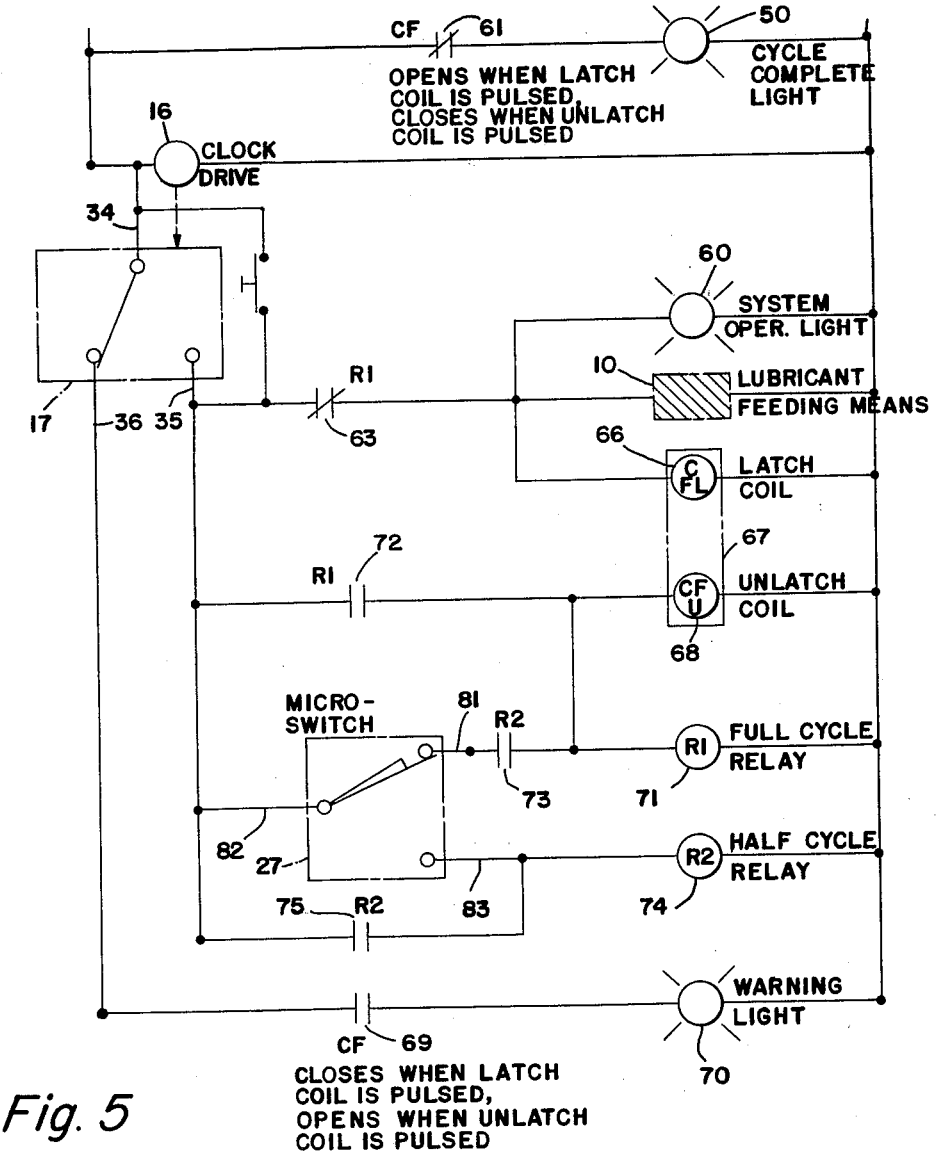
FIGURE 5 is a diagrammatic representation of a particular form of circuit embodying the monitoring and control system shown in FIGURE 2.

A particular circuit is shown in FIGURE 5. The switch 17 is shown in its normal or quiescent phase position. The cycle counter switch 27 is shown in the position it occupies between counts.

Under these conditions a normally closed switch 61 establishes a circuit through the "normal" or "satisfactory history" indication means 50 which in the particular example is a green light.

The clock drive 16 is constantly running.

When the "on" pin 20 contacts the tab 18 the switch 17 reverses its position from that illustrated and establishes contact between the leads 34 and 35. The switch 63 is normally closed and the lubricant feeding means 10 is thereby energized.

Provided in parallel with the lubricant feeding means 10 is the indicator 60 which may be an amber light and indicates that the lubrication operation is in process. A circuit is also simultaneously established through the self-interrupting latch coil 66 of a cycle failure relay 67.

The cycle failure relay 67 is also provided with a self-interrupting unlatch coil 68. The arrangement is such that when the latch coil 66 receives a pulse of energy, the relay latches into a position such that the switch 61 is open and another normally open switch 69 is closed, and the switches 61 and 69 remain respectively opened and closed until subsequent pulsing of the unlatch coil 68 at which time the switches 61 and 69 respectively assume their normal conditions, i.e., closed and opened respectively.

As is well known, the coils 66 and 68 are self-interrupting in the sense that the relay is arranged so that the circuit through the coils 66 and 68 is broken as soon as, respectively, the latch and unlatch positions of the relay are reached. This arrangement enables the latch or unlatch condition to be maintained without continuing energization of either of the coils of the relay.

When the latch coil 66 is energized and the switch 61 is thereupon opened, the "normal" or "satisfactory history" signal 50 is discontinued. However although the corresponding switch 69 is in a circuit with an alarm such as a red light 70, this alarm is not activated because the circuit is opened since the lead 36 in the switch 17 is disconnected from the lead 34.

The operation of the lubricant feeding means 10 causes lubricant to be distributed throughout the system. At a certain stage in this process, the element 26 (FIGURE 1) on the distributor 22 will retract disconnecting the leads 81 and 82 and establishing a connection between the leads 82 and 83. During the initial portion of the cycle when the leads 81 and 82 are connected, there is no energization of the relay 71 because of the interruption of the circuit therethrough by the normally open switches 72 and 73. When the element 26 retracts and the leads 82 and 83 are interconnected, the relay 74 is energized and causes a normally open holding switch 75 to close. Energization of the relay 74 also causes the normally open switch 73 to close. However the switch 72 remains open since it is controlled by the relay 71 and not the relay 74. As the lubrication cycle approaches its completion, the element 26 again moves outwardly and moves the switch 27 to the position illustrated in FIGURE 5. Since the relay 74 remains energized because of the holding relay 75, the switch 73 remains closed and as the leads 81 and 82 are reconnected, the relay 71 is energized. This causes the holding switch 72 to be closed. The unlatch coil 68 of the cycle failure relay 67 is also momentarily energized to close the switch 61 and open the switch 69. Energization of the relay 71 closes the holding switch 72 so that even after the self-interrupting coil 68 interrupts itself, the relay 71 remains energized. The completion of the outward movement of the element 26 therefore signals the completion of the lubricating cycle. When the relay 71 is energized, the normally closed switch 63 is opened, interrupting energization of the lubricant feeding means 10 and also de-energizing the "system operating" indicator 60. Closing of the switch 61 as by pulsing of the unlatch coil 68 immediately re-energizes the green light 50 and indicates that the desired distribution of lubricant has been accomplished. Subsequently when the "off" pin 20 (FIGURE 3) touches the tab 19 to move the switch 17 back to the position illustrated in FIGURE 5, no further change occurs except that the relay 71 is de-energized by interruption of the connection between the leads 34 and 35. The alarm 70 is not energized because the switch 69 is now open.

However, should the switch 17 move back to its normal position shown in FIGURE 5 prior to the switch 27 leaving the illustrated position shown in FIGURE 5, the alarm 70 will be actuated because the switch 69 will remain closed since the latch coil 66 will have been energized but the unlatch coil 68 will not have been energized. The same will remain true if the switch 27 moves to its opposite position. Only by moving the switch 27 from its illustrated position to its opposite position and then back again before return of the switch 17 to its illustrated position will be establishment of the red warning light be avoided. Thus it will be understood that the illustrated system provides warning means responsive to a sequence in which the active phase of the timer terminates prior to the completion of the back and forth plunger movement, but not responsive to the opposite sequence.

The invention is not restricted to the slavish imitation of each and every one of the details described above which have been set forth merely by way of example with the intent of most clearly setting forth the teaching of the invention. Obviously, specific structural details may be changed or eliminated without departing from the invention.

What is claimed is:

1. A lubrication and monitoring system for intermittently properly proportioning lubricant among a plurality of points over a period of months or years while at any moment indicating whether the history of the operation of the system is satisfactory as of that moment, comprising lubricant feeding means, cyclic type lubricant distribution means having an element whose back and forth movement measures the volume of lubricant delivered by the system, means for activating said lubricant feeding means for relatively short intervals which are spaced relatively far apart from each other in time, means for counting the number of back and forth movements of said measuring element occurring as a result of said actuation, and means for indicating at the conclusion of each of said relatively short intervals whether a desired count of back and forth movements has been reached within the interval and for maintaining said indication as to the most recent one of said relatively short intervals during the time between said most recent relatively short interval and the next successive one of said relatively short intervals.

2. A flow-responsive automatically controlled lubrication system comprising at least one cyclic type lubricant distributor having a plurality of plungers each of which travels back and forth once in the course of each cycle of operation of said distributor, lubricant feeding means for supplying lubricant to said cyclic type distributor, lubricant system activating means establishing a relatively long quiescent phase and a relatively short active phase, indication means, means for turning on said lubricant feeding means upon initiation of said active phase, means for thereafter turning off said lubricant feeding means upon completion of a full lubrication cycle as measured by at least one full cycle of back and forth movement of a plunger of said cyclic type lubricant distributor, and means for allowing continued activation of said indication means only upon completion, during said active phase, of said full lubrication cycle as measured by said at least one full cycle of back and forth movement of a plunger, whereby flow responsive positive monitoring of the distribution of lubricant is maintained.

3. A flow-responsive automatically controlled lubrication system comprising at least one cyclic type lubricant distributor having a plurality of plungers each of which travels back and forth once in the course of each cycle of operation of said distributor, lubricant feeding means for supplying lubricant to said cyclic type distributor, lubricant system activating means establishing a relatively long quiescent phase and a relatively short active phase, indication means, means for turning on said lubricant feeding means upon initiation of said active phase, means for thereafter turning off said lubricant feeding means upon the first to occur of the following: (1) termination of said active phase and (2) completion of a full lubrication cycle as measured by at least one full cycle of back and forth movement of a plunger of said cyclic type lubricant distributor, and means for allowing continued activation of said indication means only upon completion, during said active phase, of said full lubrication cycle as measured by said at least one full cycle of back and forth movement of a plunger, whereby flow responsive positive monitoring of the distribution of lubricant is maintained.

4. A flow-responsive automatically controlled lubrication system comprising at least one cyclic type lubricant distributor having a plurality of plungers each of which travels back and forth once in the course of each cycle of operation of said distributor, lubricant feeding means for supplying lubricant to said cyclic type distributor, lubricant system activating means establishing a relatively long quiescent phase and a relatively short active phase, means for turning on said lubricant feeding means upon initiation of said active phase, means for thereafter turning off said lubricant feeding means upon completion of a full cycle of back and forth movement of one of the plungers of said lubricant distributor means, and warning means responsive to a sequence in which said active phase terminates prior to the said completion of said back and forth plunger movement, whereby flow responsive positive monitoring of the distribution of lubricant is maintained.

5. A flow-responsive automatically controlled lubrication system comprising at least one cyclic type lubricant distributor having a plurality of plungers each of which travels back and forth once in the course of each cycle of operation of said distributor, lubricant feeding means for supplying lubricant to said cyclic type distributor, lubricant system activating means establishing a relatively long quiescent phase and a relatively short active phase, means for turning on said lubricant feeding means upon initiation of said active phase, means for thereafter turning off said lubricant feeding means upon completion of a full cycle of back and forth movement of one of the plungers of said lubricant distributor means or upon termination of said active phase, whichever is first, and warning means responsive to a sequence in which said active phase terminates prior to the said completion of said back and forth plunger movement, whereby flow responsive postive monitoring of the distribution of lubricant is maintained.

References Cited in the file of this patent
UNITED STATES PATENTS

| | | |
|---|---|---|
| 2,141,022 | Rotter | Dec. 20, 1938 |
| 3,066,759 | Stevenson | Dec. 4, 1962 |